United States Patent [19]

Tobin

[11] Patent Number: 5,169,475
[45] Date of Patent: Dec. 8, 1992

[54] DELAMINATION MEDIUM, APPARATUS AND METHOD

[75] Inventor: William P. Tobin, Salem, N.H.

[73] Assignee: Polaroid Corporation, Cambridge, Mass.

[21] Appl. No.: 774,556

[22] Filed: Oct. 10, 1991

Related U.S. Application Data

[60] Division of Ser. No. 616,796, Nov. 21, 1990, which is a continuation-in-part of Ser. No. 599,714, Oct. 19, 1990, abandoned.

[51] Int. Cl.[5] .................... B32B 35/00; G03C 11/12
[52] U.S. Cl. .................... 156/344; 156/584; 271/114; 430/253; 430/256
[58] Field of Search .......... 156/584, 344, 234; 430/256, 257, 258, 259, 260, 261, 262, 253; 354/86, 304; 355/315; 271/114, 900; 242/67.4

[56] References Cited

U.S. PATENT DOCUMENTS

| | | | |
|---|---|---|---|
| 3,266,797 | 8/1966 | Stievenart | 156/584 X |
| 3,441,458 | 4/1969 | Milliken | 156/344 X |
| 3,669,665 | 6/1972 | Faigenbaum et al. | 430/258 |
| 3,936,343 | 2/1976 | Walls | 156/368 |
| 4,165,251 | 8/1979 | Matsumoto et al. | 156/584 |
| 4,183,751 | 6/1980 | Matsumoto et al. | 430/260 X |
| 4,508,589 | 4/1985 | Tarui et al. | 156/584 |
| 4,670,085 | 6/1987 | van der Meer et al. | 156/584 |

FOREIGN PATENT DOCUMENTS 62-152707  7/1987  Japan .................... 156/344
8804237   6/1988  PCT Int'l Appl. .

Primary Examiner—David A. Simmons
Assistant Examiner—Mark A. Osele
Attorney, Agent, or Firm—Louis G. Xiarhos

[57] ABSTRACT

A novel laminar sheet structure having at least two sheets of different stiffnesses in releasably adhering engagement with each other, the sheet of the lesser stiffness having a marginal portion extending beyond on adjacent margin of the sheet with the greater stiffness.

Also disclosed is an apparatus for delaminating the laminar sheet structure having at least one rotatably mounted roller with an axial slot in its peripheral surface for receiving the marginal portion of the sheet of lesser stiffness so that the sheet may be wound upon the roller while the sheet of greater stiffness is separated therefrom, and a method of delaminating the structure by the apparatus.

11 Claims, 7 Drawing Sheets

DELAMINATION MEDIUM, APPARATUS AND METHOD

This is a division of application Ser. No. 616,796, filed Nov. 21, 1990, which is a continuation in part of application Ser. No. 07/599,714 filed Oct. 19, 1990 now abandoned.

BACKGROUND OF THE INVENTION

1. Field of the Invention

The invention, in general, relates to a novel delamination apparatus and method, and to a laminate for use therewith, and, in particular, to an apparatus and a method of processing a thermal imaging medium, as well as to a novel laminar imaging material.

2. The State of the Art

The prior art is replete with apparatus and methods for separating layers of laminar film units, for instance, for the purpose of rendering a developed image visible. Such apparatus and methods are most commonly used in connection with so-called peel-apart film units and may utilize a blade of some kind insertable between two predetermined layers or sheets of a film unit fixed to the periphery of a rotating drum; vide, for instance, U.S. Pat. No. 4,670,085.

In general, the prior art apparatus and methods may be characterized as providing a peeling action, i.e. removal of one layer from another. They would not, however, be suited for providing delamination as understood in the context of the present invention. Delamination, in the sense used herein, is to be understood as meaning a process of separating cover or support sheets from opposite surfaces of a vertically frangible layer each carrying different portions of the frangible layer with it as determined by the strength of an adhesive bond at any given point between the surfaces of the layer and the respective sheet. Vertical frangibility of the layer as used herein is intended to mean the ability of the layer to break in a direction normal to its surfaces but to exclude breaking of the layer between its surfaces.

STATEMENT OF THE INVENTION

It is an object of the invention to provide a novel apparatus for delaminating a composite sheet structure comprising a plurality of selectively releasable superposed sheets.

More particularly, it is an object of the invention to provide a novel apparatus for delaminating a composite sheet structure of the aforesaid kind in such a manner that predetermined portions of a frangible layer interposed between, and releasably connected to, two sheets remain on one of the sheets with complementarily adjoining portions of the layer remaining on the other sheet.

Furthermore, it is an object of the invention to provide an apparatus for delamination of the kind referred to, in which the separation of a sheet from the layer may entail the removal of as small a portion of the layer as 1 u or less diameter.

It is also an object of the invention to provide an apparatus for delamination in which the separation of a sheet from the layer may entail the removal of all but a portion of the layer measuring as little as 1 u or less in diameter.

Another object of the invention resides in an apparatus for processing a thermographic film unit by separating two sheets enclosing between them a layer of an image forming substance, to remove predetermined portions from the layer thereby to form two complementary images.

Yet a further object is to provide a novel delamination method which makes possible the selective removal of portions of a frangible layer by sheets adhered to opposite surfaces of the layer.

In connection with the above and other objects it is a special object of the invention to provide a laminate which permits of treatment by the method and apparatus in accordance with the invention.

A particular object of the invention resides in the provision of a thermal imaging film unit which by the apparatus and method of this invention may provide images of an extremely fine resolution and superior optical density.

Other objects of the invention will in part be obvious and will in part appear hereinafter.

In the accomplishment of these and other objects the invention provides for an apparatus for delaminating a composite sheet structure comprising a frangible layer having a first surface adhesively bonded to one sheet at a substantially uniform strength and an opposite surface, abutting surface areas of which are, respectively, adhesively bonded to another sheet at strengths greater and less than the uniform strength and having a marginal portion attached to one and extending beyond the other of the sheets, the apparatus comprising first roller means having an axially extending slot in its peripheral surface, second roller means positioned in parallel to the slot, means for inserting the marginal portion into the slot, and means for rotating the first roller in a direction winding the one sheet on the first roller and moving the other sheet away from the first and second rollers.

The laminate in accordance with the invention preferably comprises first and second flexible sheets attached to opposite surfaces of a frangible layer, one of the sheets having a marginal portion extending beyond an adjacent margin of the other sheet.

BRIEF DESCRIPTION OF THE DRAWINGS

Preferred embodiments of the invention will hereinafter be described with reference to the drawings in which.

Figure 1:
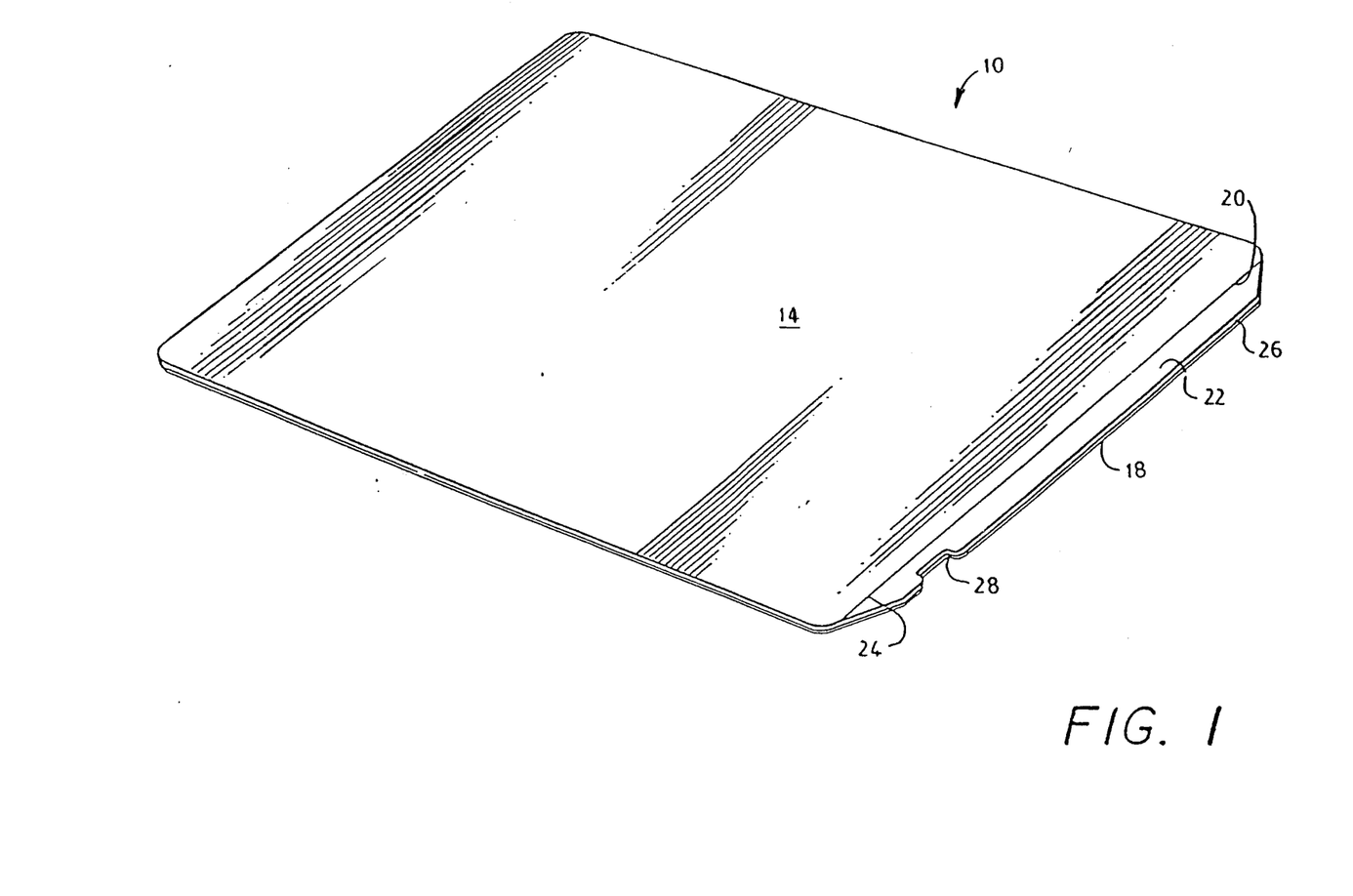
FIG. 1 is a perspective view of a preferred embodiment of the laminate in accordance with the invention.
Figure 2:
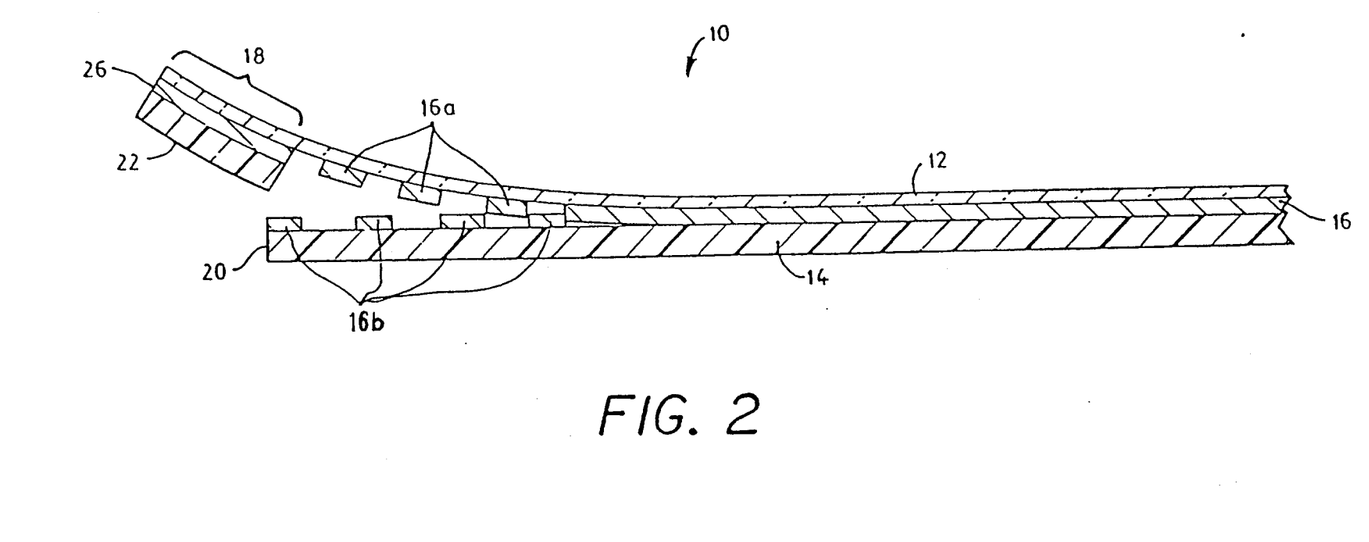
FIG. 2 is a view, in longitudinal section, of the laminate of FIG. 1 depicting certain aspects of its delamination characteristics with the thicknesses of its several sheets being exaggerated for clarity.

A laminate 10, shown in FIG. 1 and 2 in its preferred embodiment as a thermal imaging film unit of the general kind disclosed by International Application PCT/US 87/03249, may consist of first and second support sheets 12 and 14 being respectively adhesively connected to opposite surfaces of a frangible layer 16. In a film unit the frangible layer 16 may be a coating of an image forming substance. In its initial unexposed state the laminate 10 is such that the adhesive bond between the layer 16 and the sheet 12 is weaker than the bond between the layer 16 and the sheet 14. The frangible layer 16 may itself be a composite of several layers conducive to forming an image of desirably high resolution and optical density as a result of thermal exposure and subsequent processing, including delamination as provided by the instant invention.

For purposes of the present invention it is sufficient to note that the layer 16 is such that it serves as a heat shield and that it may be ruptured in a direction normal to its two surfaces along lines defined by a thermally exposed image such as described in the International Application, supra. In general, as a result of the exposure the bond between those portions of the frangible layer 16 and the sheet 12 becomes stronger than the bond existing ab initio between the portions of the layer 16 and the sheet 14 which were not exposed to heat.

The exposure may be carried out by a laser scanning technique, and while in the embodiment depicted, the exposure preferably takes place through the thinner sheet 12, it will be understood by those skilled in the art that exposure may instead be carried out through the thicker sheet 14. Such an exposure would, of course, require a bond strength between the sheet 12 and the layer 16 stronger than the initial bond between the sheet 14 and the layer 16. Furthermore, it would also be possible instead of strengthening the adhesive bond by the application of heat to weaken it.

It is advantageous to prevent the heat from penetrating through the layer 16 in order to leave the bond between the opposite sheet and the layer substantially unaffected. This may be accomplished by heat shielding properties of the layer 16 derived, for instance, from carbon particles or a heat absorbing dye, such as an IR-absorbing dye.

As a result of the heat-treatment the portions 16a of layer 16 will become more firmly bonded to sheet 12. The portions 16a and the portions 16b on sheet 14 which have not been affected by heat may then be separated from each other when the sheets 12 and 14 are delaminated in the manner of this invention.

The sheets 12 and 14 may be made of the same or of different material, polyethylene terephthalate, polystyrene, polyethylene, polypropylene, copolymers of styrene and acrylonitrile, polyvinyl chloride, polycarbonate and vinylidene chloride being some but not all of the materials suited as support sheets. They may themselves be laminar structures provided with a backing of paper (not shown) or any other material suited for any specific purpose. While it is not a requirement, it has been found to be advantageous to have one of the sheets limper, i.e., more flexible than the other. The difference in limpness may be provided by a difference in the materials of which the sheets 12 and 14 are made. Preferably, however, and as shown, the different limpnesses are attained by one of the sheets 12 being thinner than the other sheet 14.

For purposes to be described, the sheet 12 is provided with a marginal portion 18 extending beyond an adjacent margin 20 of the sheet 14. As a matter of efficient manufacture and as shown, the marginal portion 18 may, but need not, be provided by a similar portion 22 of the sheet 14 severed from it by a score or cut line 24 along its margin 20.

In a common free edge 26 of the marginal portions 18 and 22 and the intermediate layer 16 there is provided a notch 28 which may conveniently serve as an alignment means for correctly placing the laminar film unit 10, or a plurality thereof, in a cassette (not shown) provided with a complementary protrusion in an orientation to ensure that the sheet 12 is facing upwardly for proper placement within the apparatus of this invention.

The length of the laminate film unit 10 measured between the score line 24 and a rear edge may typically be about 25.5 cm (10 in.), its width may be about 20 cm (8 in.), and the dimension of the marginal portion 18 between its forward edge 26 and the score line 24 may be about 6.5 mm (0.25 in.) The thicknesses of the sheets 12 and 14 measure, respectively, about 0.013 to 0.178 mm (0.5 to 7 mil) and 0.038 to 0.254 mm (1.5 to 10 mil), good results having been obtained with sheets of thicknesses of 0.038 and 0.178 (1.5 and 7 mil), respectively. Other dimensions may, of course, be substituted. Preferably, the corners of the sheets 12 and 14 are rounded.

Figure 3:
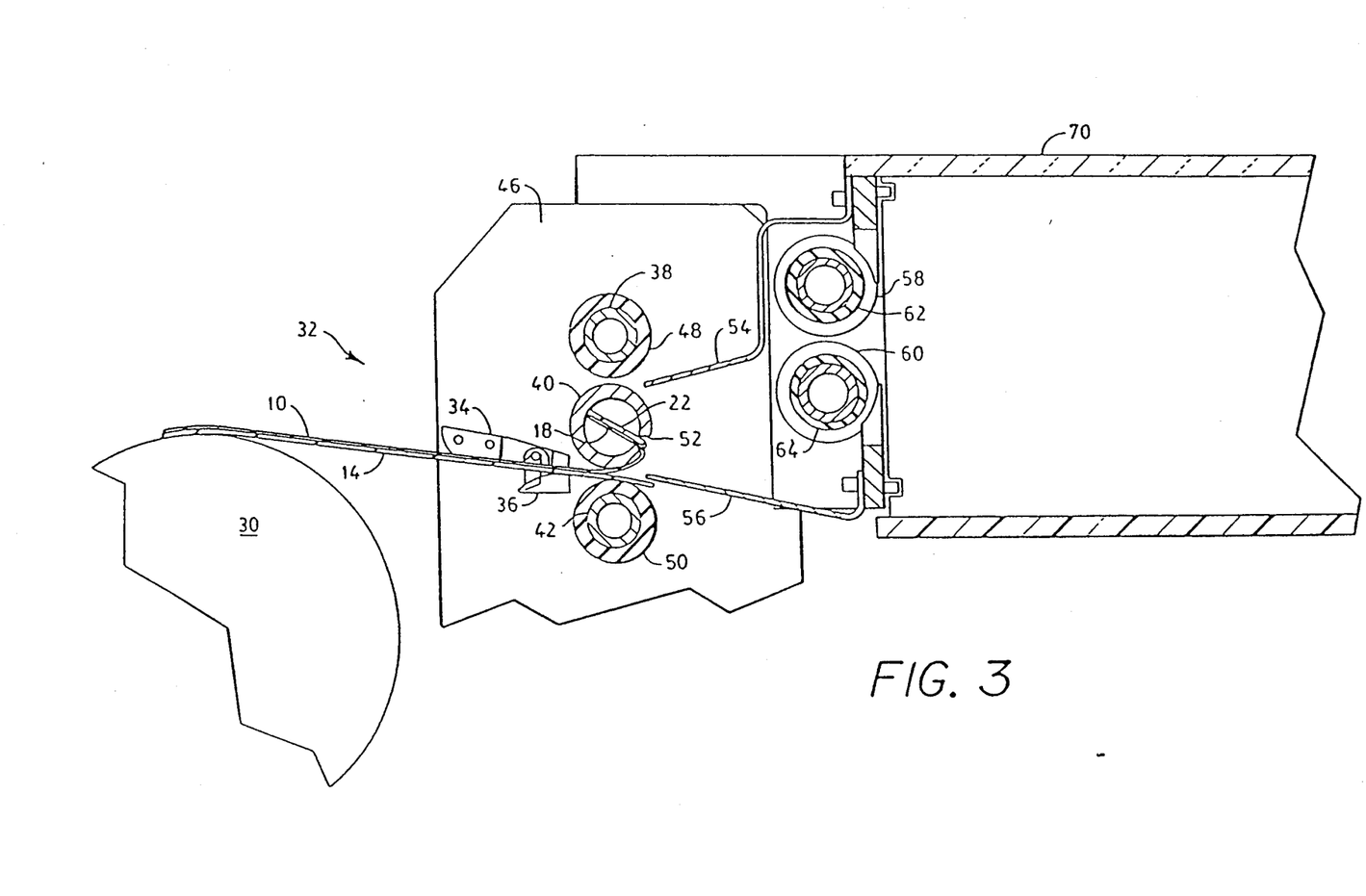
FIG. 3 is a longitudinal section through the apparatus in accordance with the invention illustrating delamination of a laminate in an early stage.

FIG. 3 discloses the film unit as it leaves a printing drum 30 upon which it was wrapped and retained, by its opposite ends, by a pair of clamps (not shown) axially extending and recessed in the periphery of the drum 30. The film unit 10 is shown as entering the delamination apparatus 32 of the present invention through a pair of horizontal parallel guides 34, 36.

Figure 5:
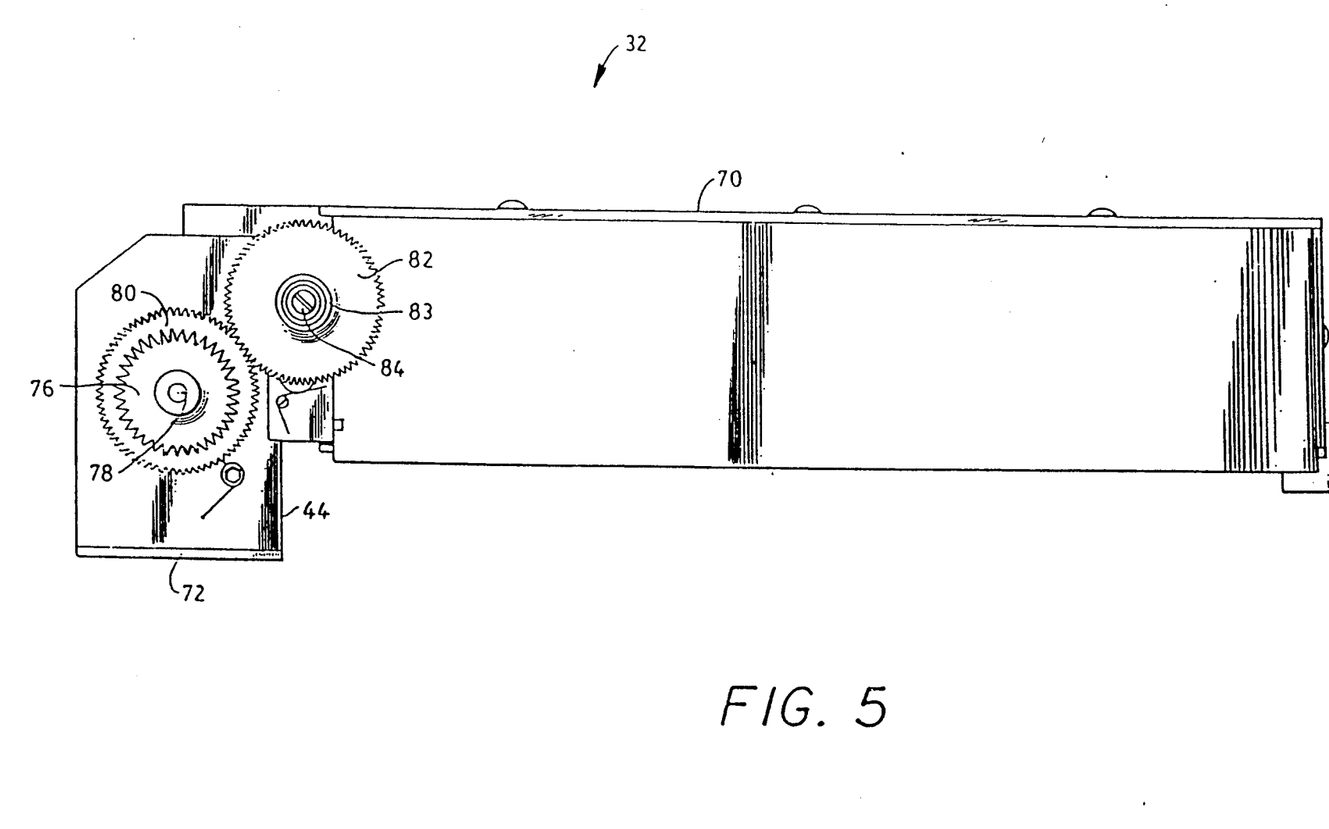
FIG. 5 is a side elevational view of the delamination apparatus of the invention.

The delamination apparatus 32 comprises a set of three rollers 38, 40, 42 made of a material, such as stainless steel, rotatably suspended in parallel relationship on axial stubs 78, 78', 78A by a pair of flanges 44, 46. The flanges 44, 46 extend from the forward end of a receptacle 70 and are provided, at their lower ends, with laterally extending feet 72, 74 upon which the apparatus 32 may rest.

Figure 6:
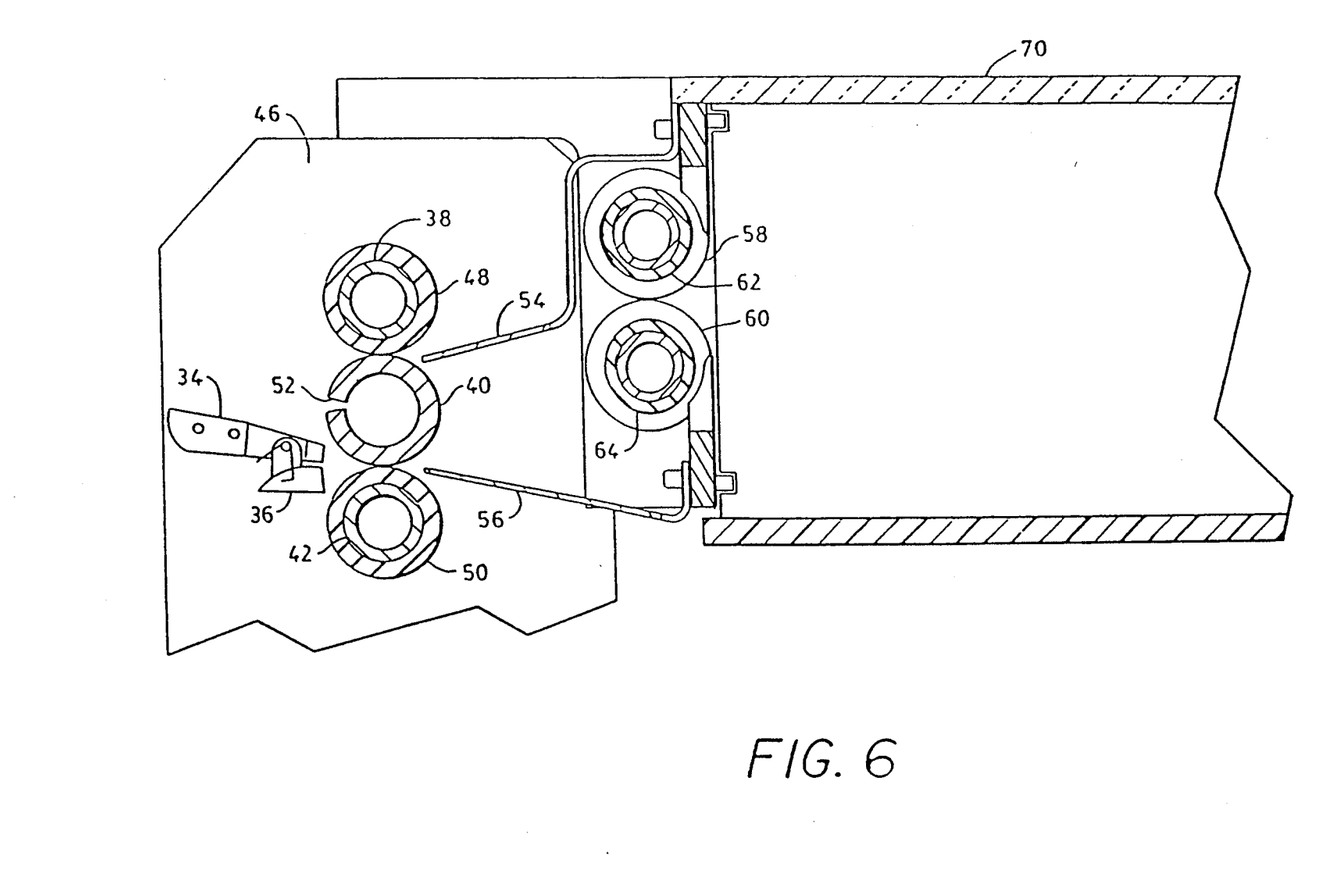
FIG. 6 is a sectional view, with parts broken away for clarity, along line V—V and on an enlarged scale, of the apparatus of FIG. 5.
Figure 7:
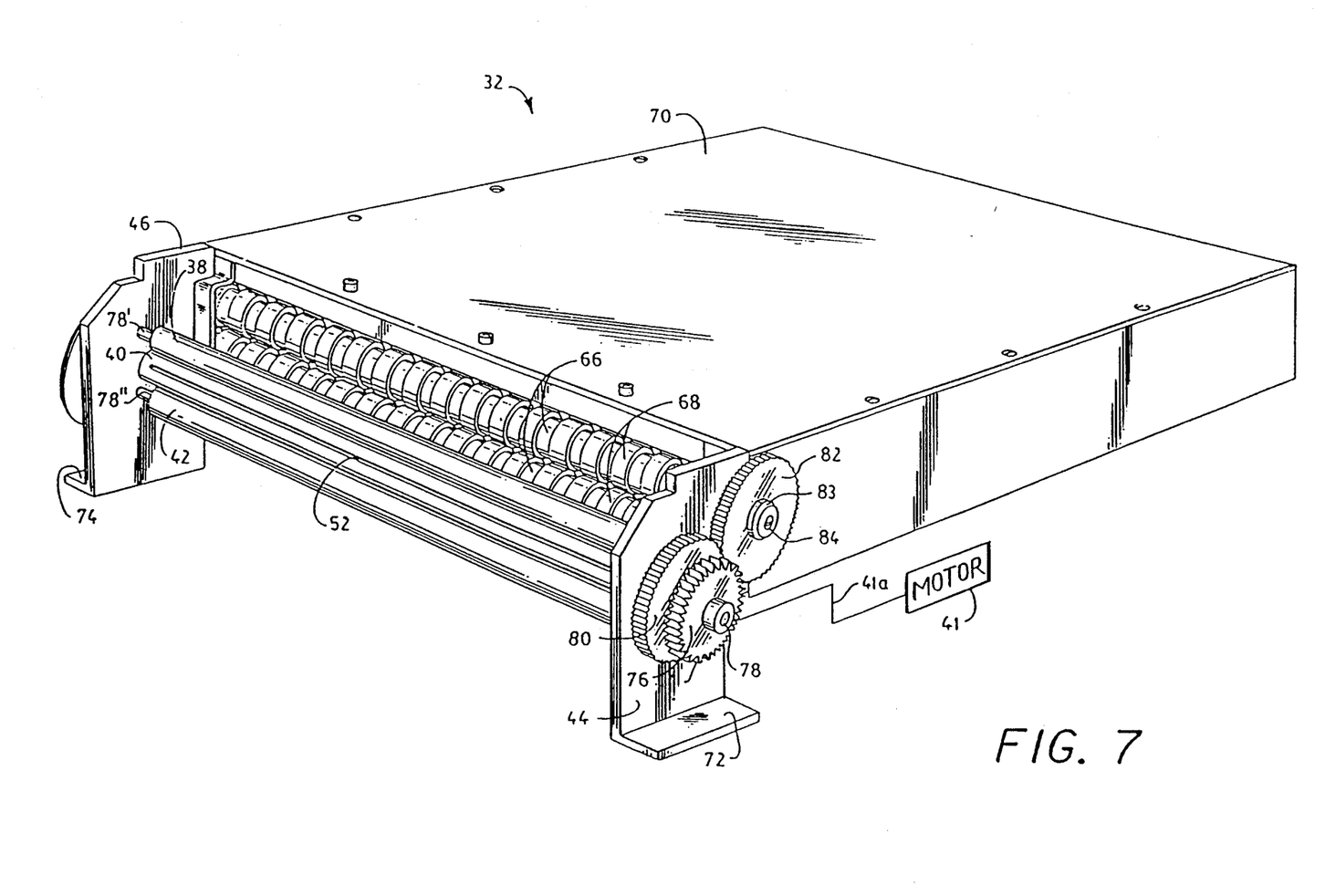
FIG. 7 is a perspective view on a reduced scale of the apparatus of FIG. 5.

The length of the rollers 38, 40, 42 corresponds to, or is slightly longer than, the width of the laminar film unit 10, i.e. 20 cm. In a manner not shown, the rollers 38, 40, 42 may be biased against each other by suitable springs, and preferably there is a slight clearance between their peripheries for purposes which will become apparent hereinafter. The roller 40 may be rotated by a bidirectional drive motor 41 connected to a pinion 76 by a transmission schematically indicated by line 41a. The rollers 38, 42 may at times be driven by the roller 40, as will be explained infra. The rollers 38 and 42 may be coated with a high friction material such as rubber or the like, as indicated by reference characters 48, 50. The roller 40 may be hollow and is provided in its periphery with a slot 52 extending axially along the periphery of the roller 40, its length being no less than the width of the laminate 10. The slot 52 may taper toward the interior of the roller 40, and for reasons to be explained infra the total depth of the slot 52 is more or less equal to the length of the marginal portion 18 of the film unit 10.

To the right of the rollers 38, 40, and 42 (FIG. 6) two ramps or guides 54, 56 extend from the receptacle 70 and serve to deflect the sheets 12, 14 of the film unit 10 as will be described. To the right of the ramps 54, 56 and at the entrance to the receptacle 70 there is provided a pair of rollers 58, 60 of substantially the same axial dimensions as, and positioned in parallel relationship to, the rollers 38, 40, 42. Like the latter, the rollers 58, 60 are rotatably mounted on the flanges 44, 46 by axial stubs 84 (only one shown). On their peripheries, the rollers 58, 60 are coated 62, 64 with high friction material, such as rubber. The coatings 62, 64 are shaped to form a plurality of alternating annular grooves 66 and elevations 68, opposing elevations 68 on the rollers 58, 60 being in frictional contact with each other.

As stated above, the roller 40 is driven by a motor 41. Motion of the motor 41 is bidirectional and may be transmitted to the roller 40 by a pinion 76 coaxially keyed to an axial stub 78 of the roller 40. Also mounted on the stub 78 is a further pinion 80 which is in meshing engagement with a similar pinion 82 mounted on the axial stub 84 of the roller 58. For reasons to become apparent hereinafter, a one-way clutch 83 permits driving of the roller 58 in a counterclockwise direction only.

The receptacle 70 is of substantially parallelepiped configuration and placed to the right of the rollers 58, 60. It is accessible through an opening spanning the length of the rollers 58, 60 and aligned with the nip or gap formed between them. The receptacle 70 may be provided with a latchable door (not shown) so that it may be periodically emptied.

The apparatus 32 functions in the following manner:

As the laminar sheet 10 is released from the printing drum 30 and fed through the guides 34 and 36 in a manner immaterial to the instant invention, its marginal portion 18, with the score line 24 facing downwardly, is inserted into the slot 52 of the roller 40. Since, as described supra, the depth of the slot 52 is substantially equal to the length of the marginal portion 18 of the laminate 10, the score line 24 of the laminate 10 will be positioned at the intersection of the slot 52 and the outer surface of the roller 40.

The roller 40 is then driven in a counterclockwise direction and begins pulling the laminate 10 to the right into the nip or gap formed between the rollers 40 and 42. The roller 58 does not move at this time because of the one-way clutch between its pinion 82 and the pinion 80 of the roller 40. As soon as the score line 24 has passed the nip formed between the rollers 40 and 42, or very shortly thereafter, the support sheet 14, because of its greater stiffness, begins to separate from the layer 16 along a line extending substantially parallel to the nip of the rollers 40, 42 in all those points of adhesive connection which as a result of the thermal exposure of the laminate 10 are weaker than the points of connection between the portions 16a of the layer 16 and the more flexible support sheet 12. As the roller 40 continues to rotate in the counterclockwise direction the more flexible support sheet 12 is wound or coiled upon the roller 40 and carries with it all those portions 16a of the frangible layer 16 which as a result of the thermal exposure have been firmly bonded to it. Owing to the bias of the rollers 38, 40, 42 toward each other, or the space between them, as the case may be, the sheet 12 becomes tightly coiled around the roller 40, the rollers 38 and 42 being driven by their frictional engagement with the roller 40 or the increasing convolutions of the sheet 12 thereon, as the case may be. At the same time, the stiffer sheet 14 is moving in a substantially straight downwardly directed path, beneath the ramp 56, to a space (not shown) provided below the receptacle 70.

Once the entire sheet 12 has been coiled upon the roller 40, the stiffer sheet 14 with the image forming portions of the layer 16 will have completely separated from the sheet 12 and from those portions 16a of the layer 16 forming thereon a complementary but disposable image.

Figure 4:
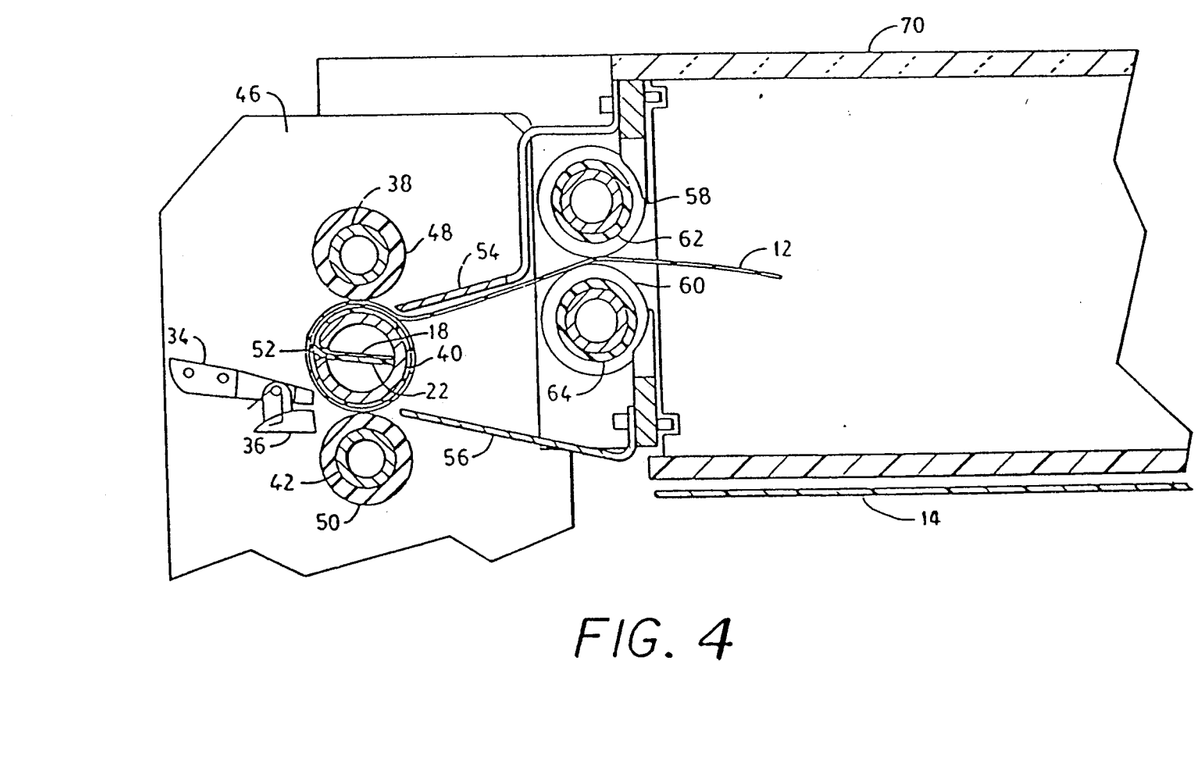
FIG. 4 is a longitudinal section similar to FIG. 3 but depicting the condition of the apparatus in an initial stage of feeding a disposable sheet of the laminate into a receptacle following the delamination.

At this time the rotation of the roller 40 is reversed into a clockwise direction, and because of the one-way clutch 83 the roller 58 is rotated in a counterclockwise direction which, in turn, causes the roller 60 to rotate in a clockwise direction. The sheet 12 begins to unwind from the roller 40 and its leading end is caught in the nip between the rollers 58, 60. Accordingly, as the sheet 12 continues to unwind from the roller 40 it is being fed through the gap between the rollers 58 and 60 into the receptacle 70 for disposal. Once the sheet 12 has been totally delivered into the receptacle 70 rotation of all rollers ceases, preferably when the slot 52 has moved into its initial position for receiving a next laminar sheet. Means such as flexible fingers (not shown) may be provided at the entrance of the receptacle 70, behind the rollers 58, 60 to prevent the sheet 12 from escaping through the entrance once it has been delivered into the receptacle 70.

For the sake of clarity circuitry and sensors, such as mechanical or photocell switches, for controlling the proper interplay between the movement of the various rollers of the delamination apparatus 32 and the laminate 10 from the moment it leaves the printing drum 30 till the sheet 12 has been taken up by the receptacle 70 have not been shown or described as they are well-known and their functions are self-evident.

As will be apparent to those skilled in the art the embodiments herein described may be modified or changed without departing from or encroaching upon the scope of the invention. All embodiments disclosed are merely illustrative and are in no way exhaustive of the scope of invention.

What is claimed is:

1. An apparatus for delaminating a composite sheet structure of the kind comprising a vertically frangible layer between first and second sheets, said frangible layer having a first surface adhesively bonded to said second sheet at a substantially uniform strength and an opposite surface abutting areas of which are, respectively, adhesively bonded to said first sheet at strengths less or greater than the uniform strength and having a marginal portion integral with said first sheet and extending beyond said second sheet, comprising:

first and second rollers positioned in parallel and forming a nip therebetween for passage of said composite sheet structure therethrough, said first roller having an axially extending slot in its peripheral surface;

means for inserting said marginal portion into said slot;

drive means for rotating said first roller in a first direction for winding said first sheet with those areas of the frangible layer bonded to it at a strength greater than said uniform strength onto the first roller and for moving said second sheet away from said first sheet and for rotating said first roller in a second opposite direction for unwinding said first sheet from said first roller;

third and fourth rollers positioned in parallel and forming a nip therebetween, said third roller being adapted, in response to said drive means for rotating said first roller, to rotation during the unwinding of said first sheet from said first roller, said rotation of said third roller being in a direction opposite from the direction of rotation of said first roller during said unwinding and being effective to capture the unwound end of said first sheet between the nip of said third and fourth rollers as said sheet unwinds from said first roller and to pass said sheet therethrough in a direction away from said first and second rollers.

2. The apparatus of claim 1, wherein the depth of the slot substantially equals the length of the marginal portion.

3. The apparatus of claim 3, wherein said third roller is connected with said drive means by a one-way clutch.

4. The apparatus of claim 3, wherein means is provided for receiving said second sheet from said third and fourth rollers.

5. The apparatus of claim 4, further comprising a fifth roller positioned parallel to said slot opposite said second roller relative to said first roller.

6. A method of delaminating a composite laminar structure comprising a vertically frangible layer between first and second sheets, said frangible layer having a first surface adhesively bonded to said second sheet at a substantially uniform strength and abutting areas of an opposite surface attached to said first sheet at strengths less and greater than said uniform strength, said composite laminar structure including a marginal portion integral with said first sheet and extending beyond said second sheet, said method comprising the steps of:

passing said composite laminar structure into a nip formed by first and second rollers, said first roller having an axially extending slot in its peripheral surface;

inserting said marginal portion into said slot;

rotating said first roller in a first direction for winding said first sheet onto said first roller, said first sheet carrying with it portions of the layer adhering to it at a strength greater than said uniform strength;

moving said composite laminar structure through said nip and separating said second sheet from said first sheet as said first sheet is wound onto said first roller, said second sheet carrying with it portions of the layer adhering to it at said uniform strength;

rotating said first roller in a second direction to unwind said first sheet from said first roller;

capturing the unwound end of said first sheet into a nip formed by third and fourth rollers positioned substantially in parallel with said first and second rollers, said third roller being adapted to rotation upon rotating said first roller in said second direction, said rotation of said third roller being in a direction opposed from said second direction; and passing said first sheet through said nip between said third and fourth rollers.

7. The method of claim 6 wherein said first and second sheets of said composite laminar structure are congruent and said marginal portion is formed by a score line severing a marginal portion of said second sheet and said layer from the remainder of said second sheet and layer.

8. The method of claim 7 wherein said first sheet is more flexible than said second sheet.

9. The method of claim 6 wherein said second sheet is completely separated from said first sheet upon the winding of the entire said first sheet onto said first roller and is passed through the nip of and away from said first and second rollers.

10. The method of claim 6 wherein said first roller rotates in a counterclockwise direction during said winding of said first sheet onto said first roller and in a clockwise direction during the unwinding thereof.

11. The method of claim 10 wherein said third roller by the action of a one-way clutch is rotated in a counterclockwise direction upon rotation of said first roller in said clockwise direction.

* * * * *